April 5, 1960 NOBUYUKI YOSHIDA 2,931,072
SINGLE LENS REFLEX CAMERA
Filed May 5, 1955 3 Sheets-Sheet 1
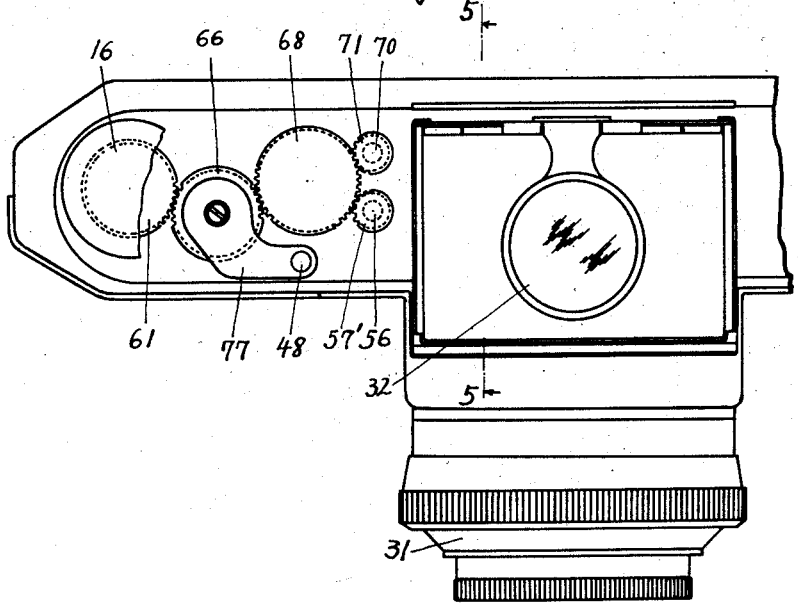
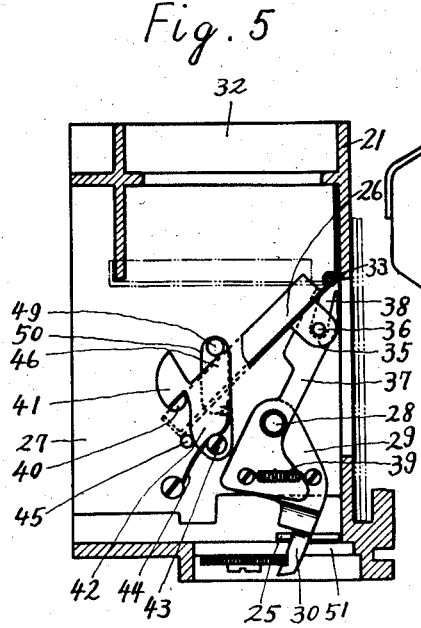
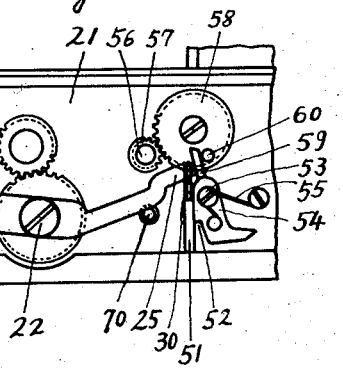
Inventor
NOBUYUKI YOSHIDA April 5, 1960  NOBUYUKI YOSHIDA  2,931,072
SINGLE LENS REFLEX CAMERA
Filed May 5, 1955  3 Sheets-Sheet 2

Inventor
NOBUYUKI YOSHIDA
by Hill, Sherman, Meroni, Gross and Simpson Attys.

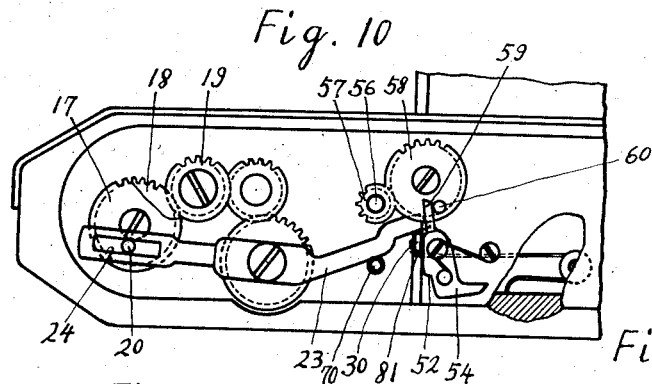
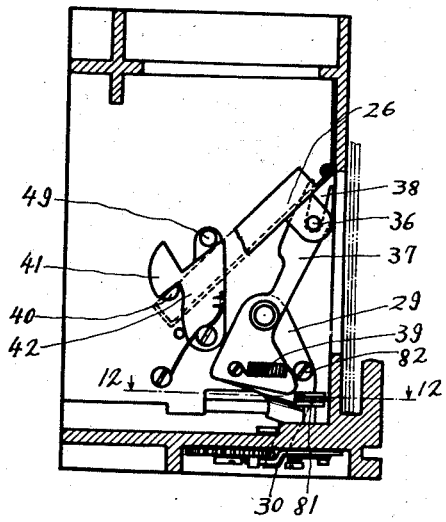
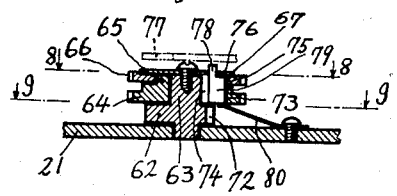
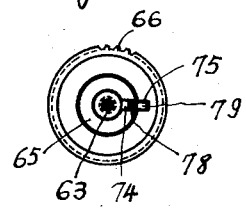
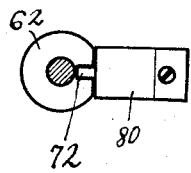
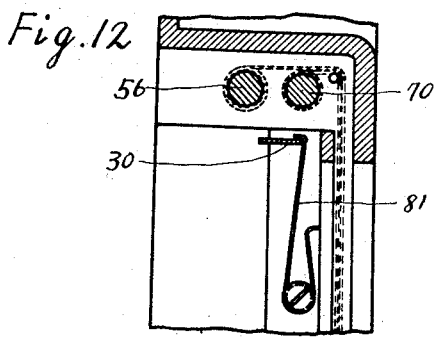

United States Patent Office
2,931,072
Patented Apr. 5, 1960

2,931,072

SINGLE LENS REFLEX CAMERA

Nobuyuki Yoshida, Tokyo, Japan, assignor to Saburo Matsumoto, Tokyo, Japan

Application May 5, 1955, Serial No. 506,265

Claims priority, application Japan May 8, 1954

17 Claims. (Cl. 95—42)

This invention relates in general to a single lens reflux camera and more particularly to an improved mechanism which drives the reflecting mirror for the viewer and the shutter mechanism.

The principal object of this invention lies in providing a mechanism wherein, in a single lens reflex camera, a plane mirror is placed diagonally between the lens system and the shutter assembly, the mirror being so positioned that, in its normal position, the image received through the lens system will be projected onto a frosted glass viewing window mounted on the top side of the camera body. This mirror is arranged to automatically swing upwardly simultaneously with the operation of the shutter and, immediately after the exposure is completed, the mirror will automatically return to its usual position, thus providing a viewing device for a single lens reflux camera whereby the scene to be taken can be viewed through the finder immediately before and after taking a picture.

Another object of the present invention lies in the provision of a mechanism whereby the reflecting mirror is arranged to swing upwardly before the leading shutter blind is released and the film exposed. Upon completion of the exposure, the mirror is returned to its normal position immediately after the lagging shutter blind is completely wound-up on its shaft, thus providing a mirror swinging mechanism which does not interfere with the film exposing process.

Another object of the present invention lies in the fact that a mechanism is provided whereby, during the film winding process to take up one frame, a spring which swings-up the reflecting mirror is tensioned. A catch plate locking the mirror is released by the shutter release button prior to the release of the shutter, and the mirror then swings upwardly by action of the aforementioned spring. The effort necessary for swinging the mirror is exceedingly small—light pressure on the shutter button is all that is necessary—and thus movement of the camera in the process of exposure is eliminated.

Another object of this invention lies in the provision of a mechanism whereby, unless the film is completely wound for the next exposure, the reflecting mirror or the shutter will remain motionless, even when the shutter release button is accidentally pressed, thus providing a mechanism whereby superposed exposures are completely eliminated.

A further object of the present invention lies in providing a mechanism whereby the reflecting mirror is positively supported against the viewing window by a locking arm device, thus preventing leakage of light through the viewing window when the reflecting mirror is raised. Furthermore, return of the mirror to its normal position is instantaneous and positive after the lagging shutter blind has run its course (completely wound on its shaft).

Other objects and advantages of the present invention reside in the details of construction and operation as will hereinafter be more fully described and claimed, reference being had to the accompanying drawings forming a part hereof, wherein like numerals refer to like parts throughout, in which:

Figure 1 is a plan view of a part of the camera with the view finder open, and part of the cover removed;

Figure 2 is a plan view of the opposite side of the camera corresponding to that shown in Figure 1 with the cover removed;

Figure 5 is a cross-sectional view taken along the line 5—5 of Figure 1;

Figure 7 is a cross-sectional view taken along the line 7—7 of Figure 6;

Figure 8 is a cross-sectional view taken along the line 8—8 of Figure 7;

Figure 9 is a cross-sectional view taken along the line 9—9 of Figure 7;

Figure 10 is a modification of this invention and is a plan view corresponding to Figure 2;

Figure 11 is a cross-sectional drawing which shows the mirror and coresponds to Figure 5; and Figure 12 is a cross-sectional view taken along the line 12—12 of Figure 11.

As shown on the drawings:

Figure 3:
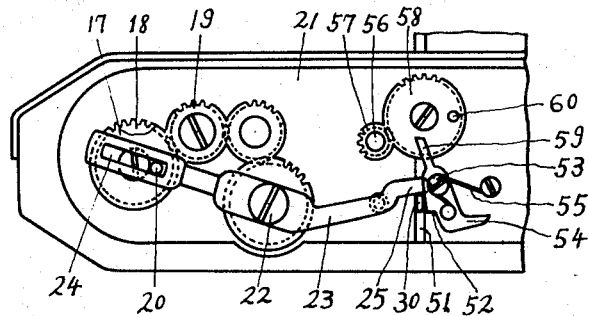
Figure 3 is a plan view corresponding to that shown in Figure 2 with the film winding shaft turned approximately 90 degrees.

Referring now to the drawings in detail, a film winding shaft 15 has fixed on one end thereof a knob 16, and on the other end thereof a gear 18. The shaft 15 does not complete one rotation for one winding, but is, for example, as in this case, made to rotate $39/40$ of one revolution. This is for the purpose of indicating the number of exposures taken. The aforementioned gear 18 in this case is made to have forty teeth, and gear 17, which is of approximately the same dimensions but having thirty-nine teeth, is mounted to freely rotate on shaft 15. Gear 19 meshes with both gears 17 and 18. Thus, when the film winding shaft 15 is wound for $39/40$ of one revolution, gear 17 will make one complete revolution.

Gear 17 has an eccentrically mounted pin 20, wherein slot 24 of lever arm 23 is mounted to rotate on the body 21 with screw 22. The other extremity of lever arm 23 crosses and pushes the end 30 of rocker arm 29. The rocker arm 29 is free to rotate around pivot screw 28 which attaches the rocker arm to partition 27 located on both sides of the mirror 26. The rocker arm is mounted on the left side partition 27 as viewed from the front of the camera.

Reflecting mirror 26 is positioned to lie at an angle of about forty-five degrees to the axis of the lens assembly 31 and thus reflects the image onto the view finder 32 which is located at the top of the camera body. The reflecting mirror 26 is hinged to the camera body 21 by shaft 33 and is lightly tensioned to swing downwardly by spring 34.

Referring now to the backside of the camera, on the two top corners of the mirror 26 are mounted brackets 35 through which shaft pin 36 is mounted. This shaft pin 36 engages the top slotted portion 38 of the mirror driving arm 37 which rotates around pivot screw 28. This screw, as described before, attaches to partition wall 27.

The bottom part of the mirror driving arm 37 is connected by a spring 39 to the upper part of rocker arm 29. When, as shown in Figure 5, the lower part of rocker arm 29 is moved to the right, due to pulling action of the spring 39, the slotted portion 38 will push the pin 36 against the tension of spring 34 and will swing the mirror 26 up to the position depicted by dotted lines, covering the bottom part of the view finder 32.

The catch plate 42, which is mounted on partition wall 27 by a screw 43 to freely rotate, is loaded by spring 44 to rotate in a counterclockwise direction and is held against stopper 45 which is also mounted on partition wall 27.

Pin 40 which is imbedded on one side of mirror 26 engages catch 41 of catch plate 42 which is positioned by the aforementioned stopper screw 45. Catch plate 42 has a protruding part which has a sloping surface 46 (somewhat resembling the hump of a hunchback).

When the shutter button 47 is pressed, the push-rod 48 moves downwardly. This push-rod 48 is spring loaded so that it will automatically return when it is released. An arm 49 attached to push-rod 48 and which protrudes through the partition 27 by means of an opening 50 engages the top part of the aforementioned slope 46 of catch plate 42. The mechanism is so positioned that when the shutter button 47 is pressed, the arm 49 will push surface 46 and will rotate the catch plate 42, causing the catch 41 to release the pin 40 of the mirror prior to the release of the shutter mechanism.

As previously described, the bottom end 30 of rocker arm 29 protrudes through an opening 51 of the body 21 and is so positioned as to engage and cross end 25 of the lever arm 23. When the film winding shaft is rotated approximately 180 degrees, the gear 17 is also set to rotate approximately one-half of a complete revolution, and lever arm 23 should reach maximum stroke at this position.

Figure 4:
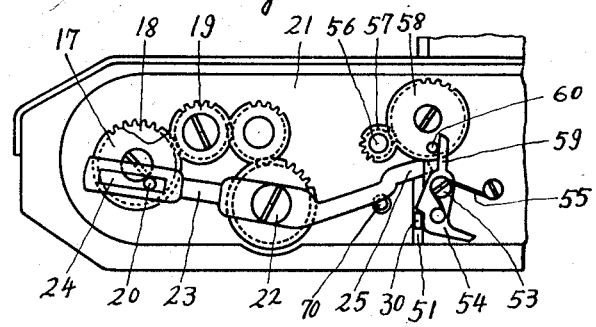
Figure 4 is a plan view corresponding to that shown in Figure 3 with the film winding shaft turned approximately 360 degrees.

As shown in Figure 5, rocker arm 29 should be in the extreme right position and protruding end 30 should be, as shown in Figures 2 to 4, at its lowest position where said arm will catch step 52 of retainer plate 54, said plate being attached to body 21 by screw 53 around which it is free to rotate. Retainer plate 54 is spring loaded by spring 55 to rotate in a clockwise direction and thus the step portion should always be in the path of aforementioned rocker arm 29. A small gear 57 which is fixed to the lagging shutter blind winding shaft meshes with a large gear 58 which is mounted to freely rotate on the bottom plate of the camera. Said gear 58 has a pin 60 which engages protruding arm 59 of aforementioned retainer plate 54, said arm being so shaped that when pin 60 engages it, retainer plate is rotated in an anti-clockwise direction, and step 52 will be removed from the path of rocker arm 29. Thus, as the film is wound, the shutter winding shaft is rotated and small gear 57 will rotate large gear 58, and pin 60 will release arm 59 which will result in step 52 of retainer plate 54 appearing into the path of rocker arm 29 due to the rotating action of spring 55 rotating retainer plate 54 in a clockwise direction.

When rocker arm 29 is pushed to its maximum position by lever arm 23, step 52 of retainer plate will catch on end of arm 29. When the shutter is released, and the lagging shutter blind has run its course, pin 60 of gear 58 engages arm 59 which turns retainer plate 54 in an anti-clockwise direction, thus releasing arm 29 from step 52 and arm 29 returns to its original position.

Figure 6:
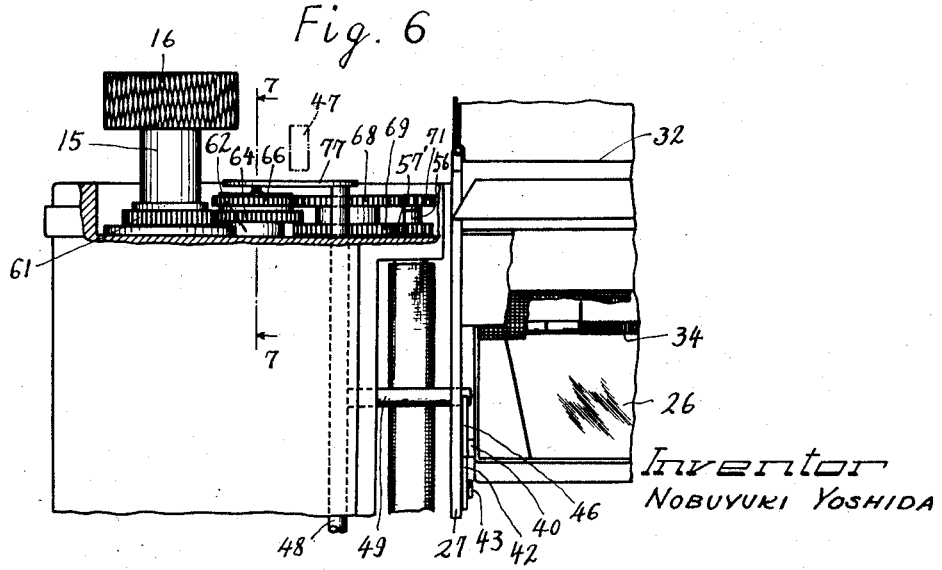
Figure 6 is a front view with the lens holding plate removed, and showing the reflecting mirror and gear coupling the film take-up shaft and shutter winding shaft.

Gear 61 is fixed to film winding shaft 15 directly under film winding knob 16. Gear 61 meshes with gear 64 (Figure 7) which is mounted to freely rotate on shaft portion 63 of stud 62 mounted on camera body 21. As previously described, film winding shaft 15 does not rotate fully 360 degrees for one winding, but for instance $3\%_{10}$ of one revolution. Therefore, the number of teeth for gear 64 is set so that gear 64 will rotate one complete revolution. Upper gear 66 is made to freely rotate on the hub 65 of gear 64, both gears are retained on aforementioned spindle shaft by means of free turning retainer washer 67 which is held by a screw on to short shaft portion 63. Upper gear 66 meshes with gear 68 which is fixed to gear 69 (Figure 6) on a common hub which is mounted to freely rotate on camera body 21. Gear 68 meshes with small gear 71 fixed to leading shutter blind winding shaft 70 and gear 69 meshes with small gear 57 which is fixed to lagging shutter blind winding shaft 56. Gear supporting stud 62 has a key-slot 72, gear 64 has key-way 73 which extends to key slot 74 on gear hub 63. Key-way 75 is formed on the inside of gear 66 and retaining washer 67 has a square hole 76 positioned in line with key-slot 74 on gear hub 65. A key 79 with protrusion 78 which passes through hole 76 and is at the same time formed to slide freely through key-way 73 of gear 64 and key-slot 74 of gear hub 65 and key-way 75 of gear supporting stud 62. The free end of spring 80 mounted at one end to body 21 applies tension to bottom end of key 79 holding it flush with the bottom surface of gear 64. Thus, gears 64 and 66 are locked to rotate together by key 79. Pressure plate 77 fixed on end of push-rod 48 is positioned and shaped so as to engage gear 66, thus when shutter button 47 is pressed, this in turn will press down pressure plate 77 which in turn will push downwards push-rod 48. Simultaneously pressure plate 77 will engage protruding end 78 of key 79 and press this down against the tension of spring 80 and eventually step portion of key 79 will release key-way 75 of gear 66, thus freeing gear 66 to rotate independently of gear 64. However, this is only possible when the position of the key coincides with that of the key-slot 72 on gear supporting stud 62. When in any other position, pushing down of the shutter release button will not cause pressure plate 77 to depress the protruding end 78 of the key. Therefore, as explained above, when by rotating knob 16 of the film winding shaft 15, film for one exposure is wound, gear 61 fixed to shaft 15 will drive gear 64 which will rotate gear 66 through locking action of key 79. Gears 68, 71 and 69, 57 will drive leading and lagging shutter winding shafts 70 and 56, the gears are so ratioed and the mechanism so designed that when winding of the shutter blinds is complete, gears 64 and 66 rotate one complete revolution. Thus, key 79 is positioned to coincide with key slot 72 on gear supporting stud 62.

Furthermore, when film winding shaft 15 is rotated for one complete winding, gear 18 fixed on the bottom end of the winding shaft turns gear 19 which rotates gear 17 mounted to freely rotate on winding shaft 15. The number of teeth in gears 19 and 17 are so arranged that gear 17 completes one revolution for one winding. A pin 20 is eccentrically mounted on the bottom surface of gear 17 and engages a slot formed in end of lever arm 23 which is thereby rocked to and fro. The other end 25 of lever arm 23 engages end 30 of rocker arm 29 and rotates this in an anti-clockwise direction as shown in Figure 5. Lagging shutter blind winding shaft 56 has fixed at one end as shown in Figures 2 and 4. An eccentrically mounted pin 60 on surface of gear 58 is positioned to disengage arm 59 of retainer plate 54. Said plate 54 is loaded by spring 55 to rotate in a clockwise direction thus step 52 of the retainer plate is placed in the path of end portion 30 of rocker arm 29, locking same when lever arm 23 is in its extreme forward position (i.e., at maximum stroke), and during this process, spring 39 will become fully stretched and energized.

When shutter button 47 is pressed while sighting the scene to be taken through view finder 32, branch arm 49 of push-rod 48 will descend and engage sloping surface 46 of catch plate 42 causing this plate to rotate and release catch 41 from pin 40.

Mirror driving arm 37 as shown in Figure 5 will rotate in an anti-clockwise direction through pulling action of spring 39, and fork-shaped end portion 38 of driving arm 37 will push pin shaft 36 and thereby swing upwards mirror 26 against the tension of spring 34. Mirror 26 will close against the under surface of view finder 32 and thus will prevent the leakage of light.

When the shutter release button is pressed, push-rod 48 will be pushed down by action of pressure plate 77. Pressure plate 77 will simultaneously engage protruding end 78 of key 79 causing said key to descend and free gear 66. Thus releasing the shutter blinds which are so arranged that first the leading shutter blind and next the lagging shutter blind will run their course and be rewound on their spring loaded shafts. As the lagging shutter blind runs its course, the shutter blind winding shaft 56 and gear 57 rotates and gear 58 will rotate in a clockwise direction as shown in the drawing. At the end of one revolution of gear 58, pin 60 will engage protruding arm 59 of retainer plate 54 which will be rotated in an anti-clockwise direction. Thus step 52 is retracted and end 30 of rocker arm 29 will be released. Rocker arm 29 is positively returned to its original position by tension of spring 39 and simultaneously the mirror hold-up action of driving arm 37 will collapse, thus reflecting mirror 26 will be returned to its original position by action of spring 34—attached to mirror hinge, and the weight of the mirror.

In this manner, it is possible to sight through the view finder immediately after taking a picture and check on whether the positioning of the camera was accurate or not. Furthermore, the above explained operation will not take place unless the film is fully wound for one exposure, in other words, when the shutter button is depressed, pressure plate 77 will engage protruding end 77 of key 79 which cannot descend unless key-slot on the gear supporting stud coincides with the key-way on the gears. Thus double exposures can be completely eliminated.

Figures 10, 11 and 12 depict a modification of this invention, in this case the spring attached to the hinge of the mirror is eliminated and the mirror is loosely hinged to the body. Also, bottom portion 30 of rocker arm 29 is tensioned to rotate in a clockwise direction by spring 81, as shown in Figure 11, furthermore, screw 82— to which spring 39 is attached—is positioned to contact bottom portion of driving arm 37. By arranging the mechanism in this manner, the end of lever arm 23 will push rocker arm 29 and will rotate said arm in an anti-clockwise direction. When said arm is locked by step portion of catch plate 54, spring 39 is extended and energized. When shutter button is pressed, branch arm 49 of push rod descends and will rotate slightly catch plate 42. Thus when pin 40 of mirror 26 is released from hooked portion 41 in the same manner as previously explained, mirror 26 will be swung in an upward direction through action of spring 39 pulling driving arm 37. As the lagging shutter blind runs its course and is wound on its spring loaded shaft, gear 58 will rotate one complete revolution and pin 60 will push protruding arm 59 of retainer plate 54 and release rocker arm 29 which will rotate in a clockwise direction through tension of spring 81, bottom end of driving arm 37 will be pushed by screw 82 and thus driving arm will rotate in a clockwise direction, and top forked part 38 of this arm will positively drive reflector mirror 26 through action of pin 36 and return the mirror to its original position.

As explained above, according to this invention, after winding the film for one exposure, and by pressing the shutter release button while sighting the camera through the view finder, the shutter is released after the mirror is swung upwardly, and during this process light is prevented from leaking into the body of the camera through the view finder. When the lagging shutter blind is rewound, the mirror is immediately returned to its original position, thus before and after taking a picture, it is possible to sight the camera through the view finder and ascertain on whether the camera had moved or whether the sighting was correct. Furthermore, for operating this mechanism it is only necessary to push the shutter button which is extremely light thus there is no chance of the camera vibrating. Another feature lies in the fact that the shutter cannot be released unless the film is completely wound for one frame, thus double exposures are completely eliminated It is understood, however, that even though there is herein shown and described a preferred embodiment of the invention, the same is susceptible to certain changes fully comprehended by the spirit of the invention as herein described and in the scope of the appended claims.

I claim as my invention:

1. A single lens reflex camera comprising a film take-up winding shaft for winding the film to position successive frames thereof for exposure, a lever operatively connected to the film take-up shaft, a rocker arm, a reflecting mirror having a rotatable drive arm for moving said mirror from an initial to an inoperative position, a spring connected between said rocker arm and said drive arm, said lever being operative upon actuation of said take-up shaft to engage said rocker arm and move said rocker arm from an initial position to a spring tensioning position to tension said spring and thus to exert a rotating force on said mirror drive arm tending to swing the mirror toward inoperative position, means for holding said reflecting mirror in operative position, shutter means, and a shutter release button for initiating exposure of the film and operative to release said holding means for releasing said reflecting mirror prior to release of the shutter means, said mirror then being deflected to inoperative position by the action of said spring and driving arm.

2. A reflex camera according to claim 1 wherein a rotatable catch plate holds said reflecting mirror, and said shutter release button has a push-rod with a branch arm for rotating said catch plate prior to release of the shutter.

3. A reflex camera according to claim 1, further comprising a common shaft, upper and lower gears on said shaft one above the other to freely rotate, a gear fixed on the film winding shaft meshing with the lower of said gears, a train of gears meshing with the upper of said gears, leading and lagging shutter blind winding shafts having gears fixed thereon meshing with said train of gears, said upper and lower gears being so arranged so as to rotate one complete revolution when the film winding shaft is wound to shift a new frame into position for exposure, said upper and lower gears having a common key-slot, a fixed shaft having a key-way below said key-slot for alignment with said key-slot in one angular position of said upper and lower gears, a common key lock for said upper and lower gears in said key-slot, a spring for holding the lower end of said common key lock flush with the lower surface of the lower gear, the key-way on the fixed shaft coinciding with the key-slot in said upper and lower gears at a predetermined angular position on the film winding shaft, a key depressing plate above the upper and lower gears and disposed to engage said key lock upon downward movement thereof, and a push-rod actuated by the shutter release button and attached to said depressing plate for releasing the reflecting mirror and for thereafter depressing said plate to disengage said key from said upper gear to initiate return of the leading and lagging shutter blinds to their shafts.

4. A single lens reflex camera according to claim 1 wherein a rotatable retainer plate has a stepped portion for engaging the rocker arm to hold the rocker arm in spring tensioning position, said shutter means including a lagging shutter blind shaft having a gear thereon, a further gear meshing with said gear on the lagging shutter blind shaft, said further gear having a pin thereon for engaging and rotating said rocker arm retainer plate to release the rocking arm, and a returning spring for returning the rocker arm to its initial position upon release thereof by said retaining plate.

5. A reflex camera according to claim 1 wherein said rocking arm has a protrusion which engages an end of the driving arm and positively drives the reflecting mirror to return to its initial position.

6. A reflex camera in accordance with claim 1 wherein said shutter means comprises leading and lagging shutter blinds which are wound during actuation of said film take-up shaft, a latch holds said rocker arm in spring tensioning position upon movement of said rocker arm from said initial position to said spring tensioning position by said lever, and means is operatively connected to said lagging shutter blind and to said latch for releasing said latch when said lagging shutter blind has completely run its course.

7. A camera comprising a member movable from a first position to a second position to store energy in a first spring during conditioning of the camera for taking a picture, first means for retaining said member in said second position, a view finding means mounted for movement between an operative and an inoperative position, second spring means for coupling said member to said view finding means and operative in the second position of said member to urge said view finding means toward inoperative position, second means operative to retain the view finding means in said operative position against the action of said second spring means when said member has moved to said second position, shutter means for exposing the film of the camera, a shutter button for initiating shutter opening, means operated by said button for actuating said second means to release said view finding means immediately prior to actuation of said shutter means to allow movement of said view finding means to said inoperative position by said second spring means, and means coupled to said shutter means and to said first means for causing said first means to release said member after actuation of said shutter means to thereby automatically release said view finder means for movement back to operative position by said first spring after actuation of said shutter means.

8. In combination in a camera having a shutter, a quick return mirror drive mechanism comprising a mirror moving member movable between operative and inoperative positions in a fixed housing, a movable rocker arm, a first spring connecting said arm to said member, a second spring connecting said arm to the housing, first means moving said arm relative to said housing and said member to energize both said springs, first latch means holding said member in said operative position, second latch means holding said arm in its operative position, means actuating said shutter and automatically releasing said first latch means immeditely prior to movement of the camera shutter to expose a film, and means actuated by said shutter automatically releasing said second latch means upon completion of movement of said shutter.

9. In combination in a single lens reflex camera having a film exposure shutter, an opening behind said lens, and a quick return mirror between said opening and lens and movable into operative position to interrupt and reflect the image passing through said lens into a viewer, spring means biasing said mirror to its operative position, second spring means for biasing said mirror upwardly out of alignment with said opening into an inoperative position, said miror being positioned in operative position, first latch means for holding said mirror in said operative position, means for initially energizing both said springs, shutter means for exposing the camera film, means operative immediately prior to opening of said shutter means to release said first latch means to permit movement of said mirror to said inoperative position, second latch means for holding said mirror in said inoperative position, and means actuated by said shutter automatically releasing said second latch means upon closure of said shutter to instantly return said mirror to said operative position.

10. A single lens reflex camera comprising a reflecting mirror mechanism, means for moving said mirror rapidly to an inoperative position including a member which is moved from an initial to an operative position to accumulate energy for moving said mirror mechanism, first spring means interconnecting said member to said mirror mechanism and energized by movement of said member to operative position, second means holding said mirror mechanism in its operative position against said spring when energized, second spring means connected to said member to urge said member toward its initial position, a latch for holding said member in its operative position, said latch being releasable to permit unopposed return of said member to its initial position by said second spring means, shutter means movable during exposure of a film in said camera, means operated on initiation of shutter movement releasing said second means causing said mirror to move into its inoperative position, means operated by said shutter means to release said latch at completion of said exposure to permit said second spring means to return said member to initial position and said mirror to its operative position without opposition, and means operated by cocking said shutter to move said member to operative position.

11. In a mirror mechanism for a single lens reflex camera having shutter means movable to expose film in the camera, a mirror moving member, means driving said member from mirror-operative to mirror-inoperative positions, said means comprising an arm coupled to said member for moving same, spring means cocked to store up energy by cocking said arm during cocking the camera shutter, first latch means holding said member against movement by said spring means and arm out of operative position, first release means for releasing said first latch to release said member for movement to inoperative position while releasing only part of the stored up energy of said spring means, second latch means holding said arm cocked with said member in inoperative position, and second release means operated by said shutter upon completion of movement exposing the film for releasing said second latch to release said arm whereupon the remaining portion of the stored up energy operates unopposed to move said member to mirror operative position.

12. In combination in a camera, a quick return mirror mechanism comprising spring means for biasing said mirror mechanism sequentially in opposite directions upon cocking of said spring means to store up a supply of energy including means for cocking said spring means, means retaining said mirror mechanism in mirror-operative position against at least part of the energy stored in said spring means, first release means releasing said mechanism to release said part of said energy to move to mirror-inoperative position without spring resistance, second means retaining said mirror mechanism in mirror-inoperative position against a further part of the stored energy urging the mechanism to mirror-operative position, second release means releasing said mechanism to release said further part of said energy to move the mechanism to mirror-operative position without spring resistance, and means coupled with said shutter for actuating said first and second release means respectively immediately prior to and subsequent to movement of the shutter to expose the film.

13. A single lens reflex camera, comprising, a mirror movable to viewing and picture taking positions, shutter means, spring means, mechanical means cooperable with said spring means for storing energy therein sufficient to move said mirror back and forth between said positions and operating to apply such energy from said spring means to move said mirror from viewing position to picture taking position without applying any energy from said spring means in opposition to such movement and further operable to apply energy from said spring means to return said mirror from picture taking position to viewing position without applying any energy from said spring means in opposition to such latter movement, and means for operating and controlling said mechanical means including manual means by which manual power is applied to said mechanical means to store energy in said spring means and including further means operated as an incident of movement of said mirror from viewing position and actuated by said shutter upon closure thereof for controlling said mechanical means to control said application of energy to the mirror for returning the mirror to viewing position.

14. In a single lens reflex camera, a movable reflecting mirror adapted to be moved between operative and inoperative positions, mirror moving means for moving said reflecting mirror including a member which is movable between first and second positions to accumulate the mirror-moving force applied to said mirror, a first latch for holding said mirror in operative position, means for moving said member from said first to said second position to apply an unopposed biasing force to said mirror tending to move said mirror to said inoperative position only, a second latch for holding said member in said second position against a biasing force urging the member into its first position, both of said biasing forces being totally energized upon movement of said member from said first to said second position, said biasing forces being accumulated in at least one spring, a camera shutter, a shutter actuator connected in controlling relation to said shutter, means including said shutter actuator to release said first latch and thereby cause said mirror to move unopposed to said inoperative position, and means actuated by said shutter and effective upon said shutter completing its operation to release said second latch and to apply only a single unopposed force to said member to move said member from said second to said first position causing said mirror to return to said operative position automatically after operation of said camera shutter.

15. In combination in a camera, a quick return mirror mechanism comprising spring means for biasing said mirror mechanism sequentially in opposite directions upon cocking of said spring means to store up a supply of energy, means for cocking said spring means to store energy for moving said mirror mechanism sequentially in said opposite directions, means retaining said mirror mechanism in mirror-operative position against at least part of the energy stored in said spring means, first release means releasing said mechanism to release said part of said energy to move said mechanism to mirror-inoperative position, second means retaining said mirror mechanism in mirror-inoperative position against a further part of the stored energy urging the mechanism to mirror-operative position, second release means releasing said mechanism to release said further part of said energy to move the mechanism to mirror-operative position without spring resistance, means positioning both said retaining means in latched condition when said spring means is cocked, and means coupled with said shutter for actuating said first and second release means respectively immediately prior to and subsequent to movement of the shutter to expose the film.

16. In a single lens reflex camera, the combination of a quick return reflecting mirror mechanism having a mirror-operative position and a mirror-inoperative position, spring bias means operatively connected to said mechanism for moving the same from said mirror-operative position to said mirror-inoperative position and then again to said mirror-operative position and including a member mounted for movement from an initial position to a second position against spring bias to accumulate energy sufficient for moving said mirror mechanism from said mirror-operative position to said mirror-inoperative position and then again to said mirror-operative position, a first latch arranged to prevent movement of said mirror mechanism from said operative position by such accumulated energy, said first latch being releasable to release a part of such accumulated energy to move said mirror mechanism to said mirror-inoperative position, a second latch acting to hold said mechanism in said mirror-inoperative position against a further part of such accumulated energy, shutter means movable to effect exposure of a film in the camera, both said latches being held latched prior to release of said first latch, means for releasing said first latch prior to such exposure, and means driven by said shutter means to release said second latch when said shutter means has completed such exposure to release said mirror mechanism, whereby said further part of said accumulated energy will be released to return said mirror mechanism to said mirror-operative position, such further part of the accumulated energy being unopposed during said return movement.

17. A single lens reflex camera, comprising, a mirror movable to viewing and picture taking positions, shutter means, spring means, mechanical means cooperable with said spring means for storing energy therein sufficient to move said mirror back and forth between said positions and operating to apply such energy from said spring means to move said mirror from viewing position to picture taking position without applying any energy from said spring means in opposition to such movement and further operated to apply energy from said spring means to return said mirror from picture taking position to viewing position, and means for operating and controlling said mechanical means including manual means by which manual power is applied to said mechanical means to store energy in said spring means and including further means operated as an incident of movement of said mirror from viewing position and actuated by said shutter upon closure thereof for controlling said mechanical means to control said application of energy to the mirror for returning the mirror to viewing position.

References Cited in the file of this patent

UNITED STATES PATENTS

| | | |
|---|---|---|
| 1,152,186 | Koehler | Aug. 31, 1915 |
| 1,388,870 | Lipp | Aug. 30, 1921 |
| 2,057,198 | Marcussen | Oct. 13, 1936 |
| 2,173,991 | Albert | Sept. 26, 1939 |
| 2,579,247 | Angenieux | Dec. 18, 1951 |
| 2,730,025 | Faulhaber | Jan. 10, 1956 |

FOREIGN PATENTS

| | | |
|---|---|---|
| 219,162 | Switzerland | Jan. 31, 1942 |
| 229,553 | Switzerland | Feb. 1, 1944 |
| 201,918 | Japan | of 1953 |